No. 683,205. Patented Sept. 24, 1901.
M. W. HIBBARD.
FLUID PRESSURE BRAKE.
(Application filed Mar. 25, 1901.)
(No Model.) 3 Sheets—Sheet 1.

Witnesses:
Inventor
Maury W. Hibbard.
By Rector & Hibben
Attys.

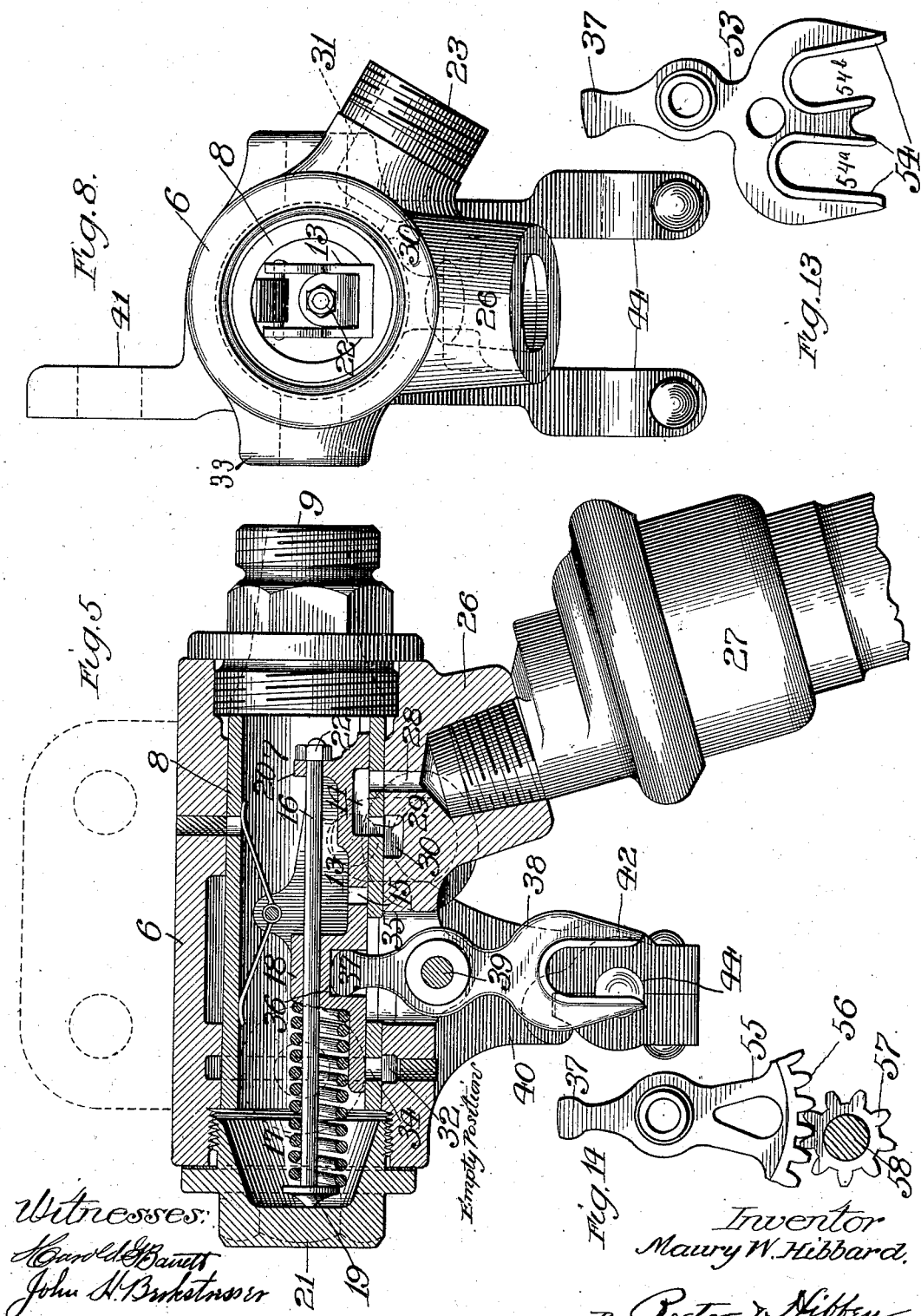

No. 683,205. Patented Sept. 24, 1901.
M. W. HIBBARD.
FLUID PRESSURE BRAKE.
(Application filed Mar. 25, 1901.)
(No Model.) 3 Sheets—Sheet 3.
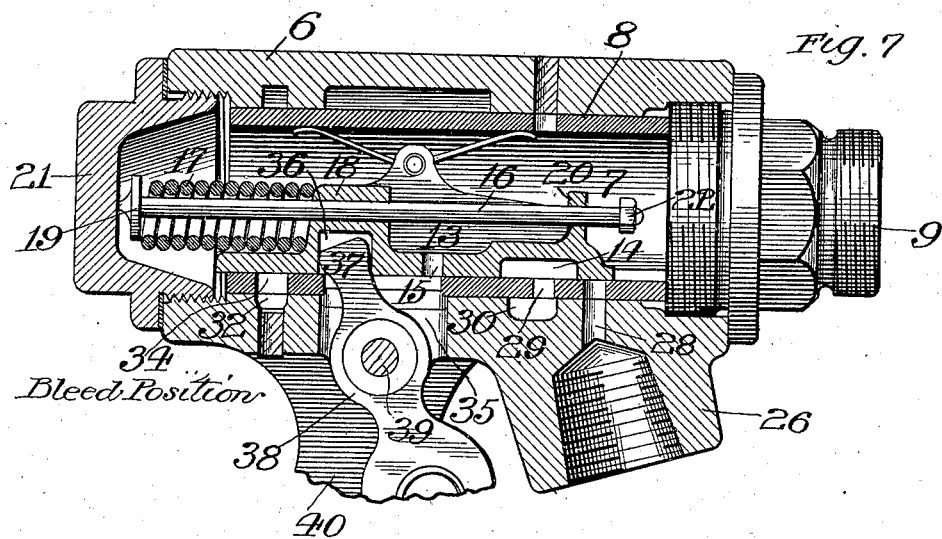
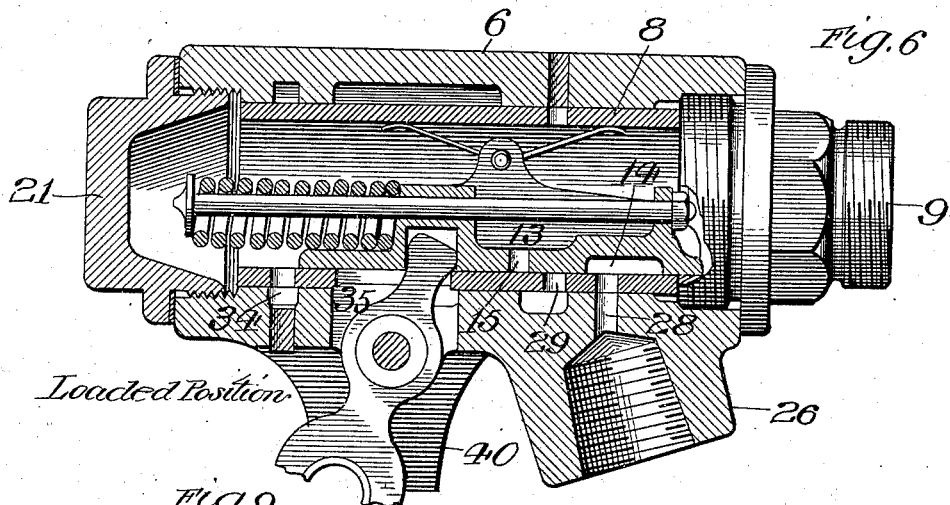
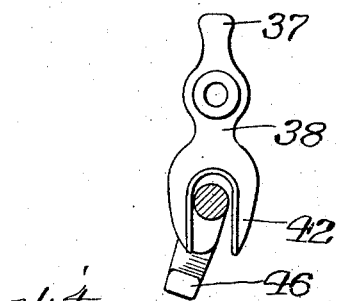
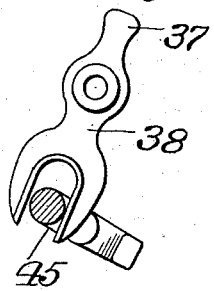
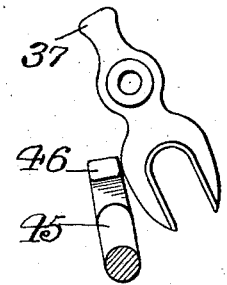
Witnesses
Harold B Barrett
John H Birketresser
Inventor
Maury W. Hibbard
By Rector & Hibben
Attys

UNITED STATES PATENT OFFICE.

MAURY W. HIBBARD, OF CHICAGO, ILLINOIS, ASSIGNOR TO RICHARD FITZGERALD, OF SAME PLACE.

FLUID-PRESSURE BRAKE.

SPECIFICATION forming part of Letters Patent No. 683,205, dated September 24, 1901.

Application filed March 25, 1901. Serial No. 52,797. (No model.)

*To all whom it may concern:*

Be it known that I, MAURY W. HIBBARD, a citizen of the United States, residing at Chicago, in the county of Cook and State of Illinois, have invented certain new and useful Improvements in Fluid-Pressure Brakes, of which the following is a specification.

My invention relates to fluid-pressure brakes generally and comprises means for regulating the amount of pressure admitted to the brake-cylinder accordingly as the car is empty or loaded; and the object of my invention is to provide novel, simple, reliable, and efficient mechanism for that purpose.

My mechanism in its present preferred and herein-illustrated form possesses another function, that of a "bleeder" for the auxiliary reservoir.

In the operation of railway-brakes for freight-cars more particularly the brakes are adjusted for a braking force of from seventy to ninety per cent. of the weight of the car empty, which arrangement has been to a partial extent satisfactory in the past when cars were built to weigh twenty-five thousand to forty thousand pounds with a carrying capacity about equal to the weight of the car. However, cars are now being built to weigh twenty-five thousand to thirty thousand pounds, with a carrying capacity of sixty to one hundred thousand pounds. The carrying capacity of a car has thus been several times increased with practically the same weight of car. Therefore the braking adjustment of a car empty is not proper or sufficient for it when loaded. To accommodate present conditions and order of things by providing for a proper braking force for a car accordingly as it is empty or loaded is the general object of my invention. The practical difficulties and objections to the present system and arrangements, which objections are considerably increased by the advent of those cars of great carrying capacity, notably steel cars, are so well known to those skilled in the art that their statement here is rendered unnecessary.

Figure 1:
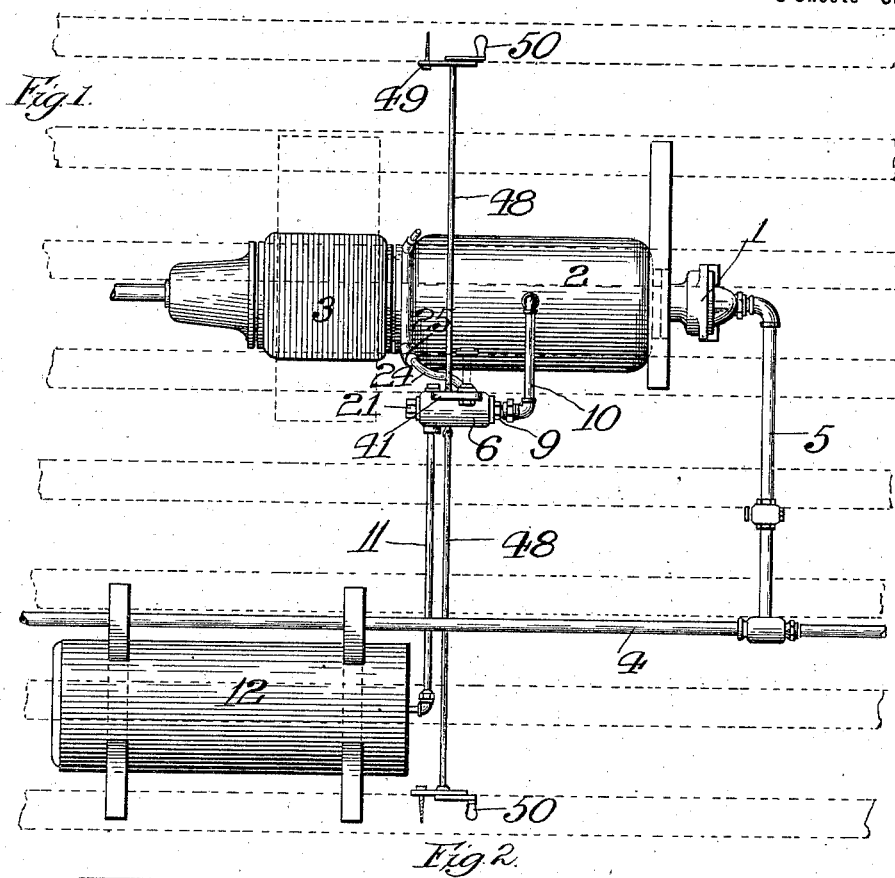
Figure 2:
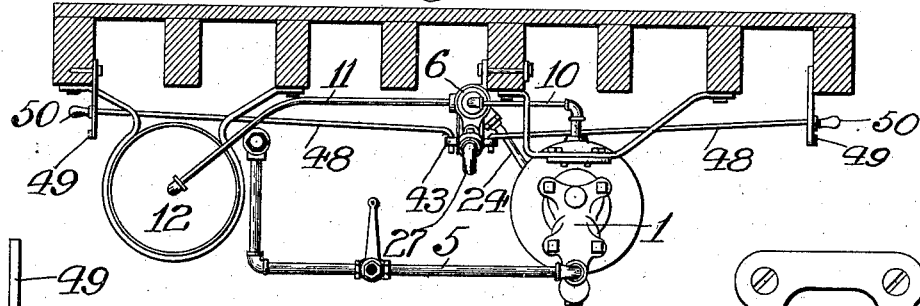
Figures 3, 4, 12:
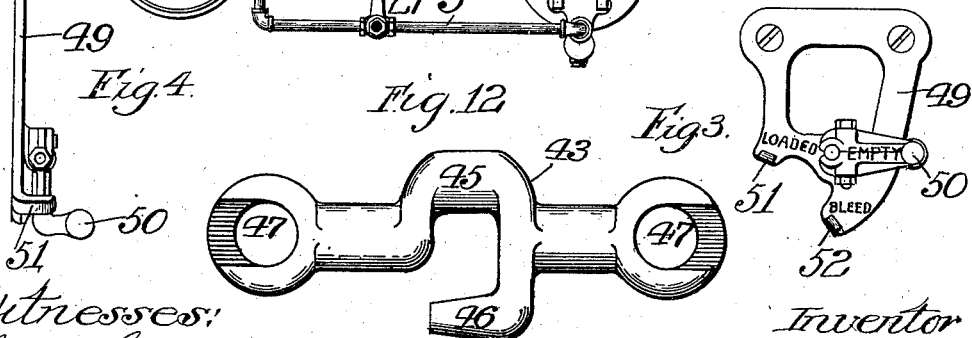

In the drawings, Figure 1 is a plan view showing the general relation between my new devices and the usual parts of an air-brake equipment of a car. Fig. 2 is a transverse section through the lower portion of a car, showing the air-brake parts in elevation; Fig. 3, an elevation of the operating handle and rod of my device and the supporting bracket or bearing therefor at the sides of the car; Fig. 4, a side elevation of said handle and bracket; Fig. 5, a longitudinal section of my device, showing the valve therein adjusted to "empty-car" position; Figs. 6 and 7, similar views showing such valve moved to "loaded-car" and "bleed" or release position, respectively; Fig. 8, an end elevation of my device; Figs. 9, 10, and 11, elevations of different positions of the operating-levers for said valve; Fig. 12, an elevation of the crank-shaft; Fig. 13, a modified form of valve-operating lever, and Fig. 14 a modified form of lever-operating mechanism substituted for the crank.

Inasmuch as my invention is more particularly applicable to freight-car service, I have illustrated the usual air-brake equipment for freight-cars, comprising the end-to-end arrangement of valve device 1, (popularly styled the "triple valve,") the auxiliary reservoir 2, and brake-cylinder 3, said valve being connected to the usual train-pipe or train-line 4 through the branch pipe 5.

My novel mechanism or valve device comprises a casing 6, Figs. 5, 6, and 7, with an interior chamber 7, conveniently termed the "regulator-valve" chamber, into which is preferably inserted a bushing 8. This chamber communicates, through the nozzle or coupling 9 and through the pipe 10, with the usual auxiliary reservoir 2, above referred to. At certain times, as hereinafter described, this chamber is put into communication through a connecting-pipe 11 with a supplemental reservoir 12, which may be arranged at any such position with respect to the usual air-brake equipment as may be found desirable or convenient. Inasmuch as my device has in addition to its principal functions the function of a bleeder or release-valve, the connection of the pipe 10 with the auxiliary reservoir may be made through the hole now commonly provided in such reservoir for the well-known bleeder, which arrangement will obviate the necessity of providing a special hole for accommodating my device.

The bushing 8 has a seat on which travels a slide-valve 13, which has a recess 14 on its under face and also a port 15. The slide-valve carries a rod 16, arranged parallel to the valve-seat or plane of movement of the valve and having a coiled spring 17, pressing at one end against an enlargement 18 on the slide-valve and against a collar 19 on the left end of the rod, Figs. 5, 6, and 7. This rod passes through the enlargement 18 and an end lug 20 and moves with the slide-valve, except when its end or collar strikes the screw-plug 21, which closes one end of chamber 7, the slide-valve being capable of a further relative movement. The rod is kept in normal relative position on the slide-valve by the nut 22 on its right end, Figs 5, 6, and 7.

The casing has a nozzle 23, connecting by a pipe 24 with the brake-cylinder through one of its usual oil-holes 25, so that the provision of additional openings to the brake-cylinder is avoided. A boss 26 is also formed in the casing and into the same is screwed or otherwise secured a suitable pressure-regulator or blow-down device 27, which may be of the construction shown in my Patent No. 619,481, dated February 14, 1899. This pressure-regulator communicates with a port and passage 28, terminating on the face of the slide-valve seat, which port is adapted, by means of the recess 14, to be put into communication with another port 29. This latter port is at all times in communication with the brake-cylinder through the passage 30, which extends in the casing underneath the bushing until it meets the brake-cylinder opening 31 in the nozzle 23. The casing also has a circular passage 32 extending underneath the bushing and connecting at one end with the supplemental reservoir 12 through pipe 11, which fits in boss 33 on the casing, and at the other end with a port 34, terminating on the face of the slide-valve seat and controlled by the slide-valves.

Suitable means may be devised for manually operating the slide-valve from either side of the car, and the following will be described as a novel, simple, and efficient means to that end: Both the side of the casing and the bushing have a slot 35, and the slide-valve at this point has a recess or socket 36, adapted to receive one end 37 of a lever 38, capable of a partial rotation. This lever is pivoted on a rod or long rivet 39 and between two arms 40, which, with the flange 41 for attachment to the car-sills, are preferably part of the same casting as the casing. The other or outer end 42 of the lever 38 is bifurcated. A crank-shaft 43 is mounted in bearings 44, and its crank 45 is received between the bifurcations of the lever 38, so that the movements of the crank-shaft may be communicated to that lever and to the slide-valve. The crank-shaft is also provided with a hook 46, extending from the shaft opposite the crank and adapted to contact an outer side of the lever 38 to give it its extreme movement after the crank has been rotated so far as to entirely clear and be outside of the bifurcations of such lever. The ends of the crank-shafts have eyelets 47 to receive the bent ends of similar rods 48 extending to either side of the car.

Preferably on the inner face of one of the sills on each side of the car is secured a bracket 49, in which is journaled the rod 48. An operating-handle 50, preferably having a longitudinal slot, is secured to the rod 48 in any suitable way. This bracket has stops 51 and 52 for the handle and is also provided with the indications "Loaded," "Empty," and "Bleed," as indicating the proper position of the crank, and consequently the slide-valve, for the purpose of adjusting the device for braking the car empty or loaded or for bleeding the reservoir to release the brake when stuck, or for any other purpose. The operating-handle is slotted in order to form a clamp and also so as to expose the lettering or indications "Loaded" and "Empty;" but the indication "Bleed" need not necessarily be so placed as to be read through the handle, because such handle has the "bleed" position only while held there by the trainman against spring tension and is returned to "empty" position when released.

The operation of my device is as follows: When the operating-handle is in position marked "Empty," the slide-valve is in the position shown in Fig. 5, in which the supplemental-reservoir port 34 is covered by the slide-valve and such reservoir therefore cut off from the regulator-valve chamber 7 and the auxiliary reservoir 2. At this time the recess 14 connects ports 28 and 29, so as to connect the brake-cylinder with the blow-down device. The braking will be done entirely with the pressure of one reservoir—to wit, the auxiliary reservoir—and the blow-down device having been set to a pretermined pressure suitable for an empty car will blow down or release to atmosphere all pressure above this amount, both in service and emergency application of the brakes, and in the manner fully set forth in my patent aforesaid. When the operating-handle is turned to the loaded position, the crank will operate to shift the lever and slide-valve to the position shown in Fig. 6, in which it is seen that the recess no longer connects the brake-cylinder with the blow-down, which is consequently "cut out," while the supplemental reservoir is "cut in" by the opening or uncovering of the port 34. At this time both air-reservoirs are available, and the brake-cylinder will during the application of the brakes retain all pressure admitted to it. With the increased amount of pressure due to the connection of the two air-reservoirs and with the blow-down device cut out of service the braking force is considerably augmented, thereby maintaining approximately, at least, the proper relation or percentage between the braking force and the weight of the car plus its load. This relation may be obtained to some extent by varying the capacity of the supplemental reservoir according to the weight of the car. When it is desired to bleed the auxiliary reservoir for any purpose, the operating-handle is brought to the position marked "Bleed," whereupon the slide-valve will be moved to its extreme position, as illustrated in Fig. 7, in which the port 15 is carried so far to the left as to connect it with the slot 35, so that the auxiliary reservoir is now in free communication with the atmosphere, and will thereby be relieved of its pressure. The pressure in the supplemental reservoir will, however, be retained, owing to the closing of its port 34. When the slide-valve is moved to empty position, the rod 16 simply contacts the end of chamber 7, but when moved to bleed it is moved to the position shown in Fig. 7 against the tension of the spring 17, which restores the parts to empty position just as soon as the trainman releases the operating-handle. If desired, however, the spring 17 may be entirely dispensed with, suitable means being provided to give the proper movements to actuate the slide-valve. In case the spring is thus dispensed with I prefer to use the form of lever 53, (illustrated in Fig. 13,) which has three arms 54, forming two bifurcations. These bifurcations or slots are marked 54ᵃ and 54ᵇ. Starting with Fig. 13, which represents empty position, (the lever standing in the same position as the lever shown in Fig. 5,) when the crank 45 of the crank-shaft is moved so as to pass out of the bifurcation 54ᵇ the hook 46 will pass into the other bifurcation 54ᵃ, and upon the further movement of the operating-rod such hook will abut the left-hand face of the arm, and thereby carry or force the lower part of the lever to the right (see Fig. 13) and the upper end 37 of such lever to the left, whereupon the bleed-port 15 will be opened. When the crank-shaft is rotated so as to bring the parts back to empty position, the hook 46 will abut the extreme left-hand arm of the lever, thereby moving the lower end of such lever to the left, closing the bleed-port 15 and bringing the parts to empty position and in a position for the crank 45 to enter the bifurcation 54ᵇ, thereby restoring the parts to this position in lieu of the spring 17. Further movement of the crank-shaft will cause crank 45 (now in bifurcation or slot 54ᵇ) to contact the right-hand face of the middle arm, thereby moving the lower part of the lever to the left and the upper part thereof to the right. Loaded position is now attained. This form of actuating-lever permits of dispensing with said spring 17.

While the crank will be found satisfactory for the operation of the slide-valve, it is evident that other expedients may be adopted. In Fig. 14 is shown such an expedient, in which the operating-lever is formed into a segment 55 as to its outer end, on which a rack 56 is provided, engaged by a small pinion 57 on an operating-rod 58, which may be a continuous rod running from side to side of the car. It is apparent, therefore, that in its broader interpretation and scope my invention is not limited to any particular means for actuating the slide-valve.

The above-described construction thus in a simple and efficient manner accomplishes all the objects hereinbefore stated and increases the efficiency of the air-brake system, permitting the same to practically meet the requirements necessitated by the present and approaching condition of things which all point toward increased carrying capacity of cars without a proportionate increase in the weight of the cars themselves.

My device is intended to be manually operated as distinguished from any automatic operation; but my invention and claims are not to be limited to manual operation, except where required by express terms in some of the claims. In actual practice it has been found impracticable to employ a regulator for brake-cylinder pressure automatically operated by the load of the car in view of several objections, chief among which may be mentioned the following: First, when the car-wheel strikes a high or a low joint the consequent force due to the weight or movement of the load or even of an empty car causes the automatic or load-regulated valve to be alternately put into and out of service, so that if the brakes happened to be applied when this valve was thus cut in on an empty or lightly-loaded car too much braking force would be applied, with the result of sliding the wheels and injuring the car, and, second, when an inspection of the air-brakes is made it is necessary that the automatic device should also be inspected and tested, which is a practical impossibility. On the other hand, when my device is once set for a certain result it remains so until positively changed by the trainman, so that the accepted percentage of braking force to the weight of the car and load is maintained approximately and practically, at least, and, moreover, my device may be tested by simply watching the movements of the crank and lever.

I claim—

1. In combination with an air-brake system, a supplemental reservoir and means for positively connecting such supplemental reservoir with the usual auxiliary reservoir when greater braking pressure is desired for loaded cars, and means for regulating the brake-cylinder pressure to a predetermined amount when such reservoirs are disconnected on an empty or light car.

2. In combination with an air-brake system, a supplemental reservoir and combined means for connecting such supplemental reservoir and the auxiliary reservoir of the brake system and for bleeding the auxiliary reservoir.

3. In combination with an air-brake system, a supplemental reservoir, a casing having a chamber communicating with such reservoir and with the auxiliary reservoir of the brake system, a valve in such chamber controlling the communication with the supplemental reservoir, means for operating such valve, and means for regulating the brake-cylinder pressure to a predetermined amount when such reservoirs are disconnected on an empty or light car.

4. In combination with a brake system, a supplemental reservoir, a casing having a chamber communicating with the supplemental reservoir, with the auxiliary reservoir, with a blow-down device and with the brake-cylinder, and means for controlling the communication with the supplemental reservoir and the said communication with the brake-cylinder and blow-down device.

5. In combination with an air-brake system, a casing communicating with the auxiliary reservoir of such system, with the brake-cylinder and with a blow-down device and means in said casing for controlling connection between said brake-cylinder communication and with the blow-down device.

6. In combination with an air-brake system, a blow-down device adapted to be put in connection with a brake-cylinder and means for cutting such device into and out of connection with the brake-cylinder.

7. In combination with an air-brake system, a supplemental reservoir, a casing having a chamber provided with ports communicating with such supplemental reservoir, with the auxiliary reservoir of the brake system, with the brake-cylinder, and with the blow-down device, and valve mechanism forming connection with the brake-cylinder port and blow-down port when the supplemental-reservoir port is closed, and closing said connection when the supplemental-reservoir port is opened.

8. In combination with an air-brake system, valve mechanism coöperating therewith to produce a predetermined braking pressure in the brake-cylinder and capable of producing a higher pressure therein, and also having means for bleeding the auxiliary reservoir of the brake system.

9. In combination with an air-brake system, a supplemental reservoir, a casing having a valve governing ports to said supplemental reservoir, to the auxiliary reservoir of the brake system, to the brake-cylinder of such system and to a blow-down device, the valve in one position closing the port to atmosphere and the port to the supplemental reservoir and connecting the brake-cylinder port with the port to the blow-down, in a second position disconnecting the brake-cylinder port and the port to the blow-down and opening the supplemental port and in a third position closing all ports except the auxiliary-reservoir port and the port to atmosphere whereby the auxiliary reservoir is bled.

10. In combination with an air-brake system, a supplemental reservoir, a casing having a chamber with ports communicating with such supplemental reservoir, the auxiliary reservoir of the brake system, with the brake-cylinder, with a blow-down device and with the atmosphere, and valve mechanism therein for governing said ports.

11. In combination with an air-brake system, a supplemental reservoir, a casing having a chamber with ports communicating with such supplemental reservoir, the auxiliary reservoir of the brake system with the brake-cylinder, with a blow-down device and with the atmosphere, a valve governing said ports and connecting the brake-cylinder port with the port to the blow-down device and at the same time cutting off the two reservoirs from each other and also closing the port to atmosphere, and also closing the brake-cylinder port and port to the blow-down device when the port to the supplemental reservoir is opened and also capable of opening said port to atmosphere when all the other ports are closed except the auxiliary-reservoir port.

12. In combination with an air-brake system, a supplemental reservoir, a blow-down device, a casing having a chamber with ports to the supplemental reservoir, to the auxiliary reservoir of the brake system, to the brake-cylinder, to the blow-down device and to the atmosphere, a slide-valve governing said ports and having a recess adapted to connect the brake-cylinder port and the port to the blow-down device, and also having a passage to connect the chamber with the atmosphere and means for operating said valve.

13. In combination with an air-brake system, a supplemental reservoir, a blow-down device, a casing having a chamber with ports to the supplemental reservoir, to the auxiliary reservoir of the brake system, to the brake-cylinder, to the blow-down device and to the atmosphere, a valve in such chamber for governing said ports, a lever working through said ports to atmosphere and operatively connected to the valve, and means for actuating such lever.

14. In combination with an air-brake system, a supplemental reservoir, a blow-down device, a casing having a chamber with ports to the supplemental reservoir, to the auxiliary reservoir of the brake system, to the brake-cylinder and to the blow-down device, a slide-valve governing said ports, said casing having a side opening, a lever operating through said opening and coöperating with said valve to actuate it and means for operating the lever.

15. In combination with an air-brake system, a supplemental reservoir, a blow-down device, a casing having a chamber with ports to the supplemental reservoir, to the auxiliary reservoir of the brake system, to the brake-cylinder, and to the blow-down device, a slide-valve governing said ports and having a socket 36, said casing having a side opening, a lever whose end passes through said opening and enters said socket to operate the valve, and means for actuating the lever.

16. In combination with an air-brake system, a supplemental reservoir, a casing having a chamber with ports to such supplemental reservoir, and to the auxiliary reservoir of the brake system and having projecting arms or lugs, a valve governing the connection between said ports, said casing also having a side opening adjacent to such valve, a lever pivoted in said lugs and having its end operatively connected to the valve and means for actuating the lever.

17. In combination with an air-brake system, a supplemental reservoir, a blow-down device, a casing having a chamber with ports to the supplemental reservoir, to the auxiliary reservoir of the brake system, to the brake-cylinder, to the atmosphere and to the blow-down device, a valve governing said ports and a spring tending to resist the valve when moved to open the said port to atmosphere.

18. In combination with an air-brake system, a supplemental reservoir, a blow-down device, a casing having a chamber with ports to the supplemental reservoir, to the auxiliary reservoir of the brake system, to the brake-cylinder, to the atmosphere and to the blow-down device, a valve governing said ports, and a spring carried by the valve and adapted to strike the end of the chamber in its further movement when it opens the said port to atmosphere.

19. In combination with an air-brake system, a valve for regulating the brake-cylinder pressure and bleeding the auxiliary reservoir, an operating-rod on the car extending to convenient reach of the trainmen, operative connection between such rod and valve, a bracket on the car having indications designating the different positions of the valve, and a crank or handle on the rod and movable over the face of the bracket.

20. In combination with an air-brake system, a valve for regulating the brake-cylinder pressure and bleeding the auxiliary reservoir, an operating-rod on the car extending to convenient reach of the trainmen, operative connection between such rod and valve, a bracket on the car having indications designating the different positions of the valve and a handle on such rod and movable over the face of the bracket.

21. In combination with an air-brake system, a valve for regulating the brake-cylinder pressure, a lever for operating such valve and having a bifurcated end, a crank-shaft having a crank coöperating with such bifurcation, and an operating-rod connected to said shaft.

22. In combination with an air-brake system having a blow-down device or pressure-regulating device for the brake-cylinder, a supplemental reservoir and a valve device adapted to connect the brake-cylinder with said pressure-regulator, and at other times to connect the auxiliary reservoir with the supplemental reservoir, said valve device having means for bleeding the auxiliary reservoir and maintaining the pressure in the supplemental reservoir.

23. In combination with an air-brake system a supplemental reservoir and manually-actuated means for causing a braking of the car with only the auxiliary-reservoir pressure or with both the auxiliary-reservoir and supplemental-reservoir pressures combined, and means for regulating the brake-cylinder pressure to a predetermined amount when the auxiliary reservoir alone is used.

24. In combination with an automatic air-brake system operating with a single brake-cylinder, means for permitting, when the car is empty, a braking pressure decreasing from a predetermined maximum to a predetermined minimum at every application of the brakes, and permitting full braking pressure when the car is loaded.

25. In combination with an air-brake system a supplemental reservoir and a valve device manually actuated to connect such reservoir with the usual auxiliary reservoir when the car is loaded whereby the triple valve vents a certain predetermined pressure into the brake-cylinder when the car is empty and vents a greater pressure into the brake-cylinder when the car is loaded, the action being effected by the same train-pipe reduction so that a loaded and an empty car in a train each performs its proportionate braking.

26. In combination with an air-brake system, a valve for regulating the brake-cylinder pressure and bleeding the auxiliary reservoir, an operating-rod on the car, operative connections between such rod and valve, a bracket on the car having indications designating the "empty," "loaded," and "bleed" positions of the valve, a handle on such rod movable over the face of the bracket and means whereby such handle and rod, after being turned to "bleed" position, are restored to one of the other said positions.

27. In combination with an air-brake system, means for producing a partial braking pressure for a car empty and producing full braking pressure for a car loaded, in combination with means adapted to communicate with the brake-cylinder for regulating said partial pressure to a predetermined amount.

28. In combination with an air-brake system, means for producing a partial braking pressure for a car empty and producing full braking pressure for a car loaded and means for regulating said partial pressure to a predetermined amount, said regulating means being cut out of service when full braking pressure is produced.

29. In combination with an air-brake system, means for producing a partial braking pressure for a car empty and producing full braking pressure for a car loaded and a pressure-reducing valve device for reducing the brake-cylinder pressure to a predetermined amount for obtaining said partial braking pressure, said valve device being cut out of service when full braking pressure is produced.

30. In combination with an air-brake system, means for producing a partial braking pressure for a car empty and producing full braking pressure for a car loaded, and a pressure-reducing valve device adapted to communicate with the brake-cylinder for reducing the pressure therein to a predetermined amount, said communication being under the control of said means whereby the valve device will communicate with the brake-cylinder when partial braking pressure is desired but will be excommunicated when full braking pressure is desired.

31. In combination with an air-brake system, means for producing a partial braking pressure for a car empty and producing full braking pressure for a car loaded, a pressure-reducing valve device adapted to communicate with the brake-cylinder, and means for rendering said valve device operative or inoperative.

32. In combination with an air-brake system, a reservoir supplemental to the usual auxiliary reservoir, a valve device adapted to connect said two reservoirs together when the car is loaded, a pressure-reducing valve having communication with the brake-cylinder, said communication being under the control of the said valve device.

33. In combination with an air-brake system, a reservoir supplemental to the usual auxiliary reservoir and adapted to communicate therewith, a valve device adapted to control the communication between said reservoirs, opening said communication for full braking pressure and closing the same for partial braking pressure and a pressure-reducing valve having communication with the brake-cylinder for reducing the pressure therein to a predetermined amount, which communication is controlled by said valve device whereby the reducing-valve will be in operative communication with the brake-cylinder when the said two reservoirs are non-communicating but will be cut out of communication with the brake-cylinder when the two reservoirs are put into communication.

MAURY W. HIBBARD.

Witnesses:
SAMUEL E. HIBBEN,
JOHN H. BERKSTRESSER.